(12) United States Patent
Kwon

(10) Patent No.: US 11,739,856 B2
(45) Date of Patent: Aug. 29, 2023

(54) VALVE FOR HYDROGEN TANK OF FUEL CELL VEHICLE

(71) Applicants: Hyundai Motor Company, Seoul (KR); Kia Corporation, Seoul (KR)

(72) Inventor: Young Jae Kwon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 51 days.

(21) Appl. No.: 17/680,918

(22) Filed: Feb. 25, 2022

(65) Prior Publication Data
US 2022/0299128 A1 Sep. 22, 2022

(30) Foreign Application Priority Data
Mar. 17, 2021 (KR) .................. 10-2021-0034377

(51) Int. Cl.
*F16K 31/40* (2006.01)
*F16K 31/06* (2006.01)
*H01M 8/04082* (2016.01)
*F16K 31/383* (2006.01)

(52) U.S. Cl.
CPC ...... *F16K 31/0693* (2013.01); *F16K 31/0655* (2013.01); *F16K 31/3835* (2013.01); *F16K 31/408* (2013.01); *H01M 8/04201* (2013.01); *H01M 2250/20* (2013.01); *Y10T 137/86928* (2015.04); *Y10T 137/86944* (2015.04); *Y10T 137/8704* (2015.04); *Y10T 137/87016* (2015.04); *Y10T 137/88022* (2015.04)

(58) Field of Classification Search
None
See application file for complete search history.

(56) References Cited

U.S. PATENT DOCUMENTS

| | | | | | |
|---|---|---|---|---|---|
| 2,575,272 | A | * | 11/1951 | Harris | F16K 31/408 251/39 |
| 3,312,445 | A | * | 4/1967 | Trombatore | F16K 31/40 251/129.21 |
| 4,848,721 | A | * | 7/1989 | Chudakov | F16K 31/406 137/454.6 |
| 5,048,790 | A | * | 9/1991 | Wells | F16K 31/408 251/44 |
| 6,293,513 | B1 | * | 9/2001 | Birkelund | F16K 31/408 251/30.03 |
| 6,443,420 | B1 | * | 9/2002 | Hettinger | F16K 39/024 251/38 |

(Continued)

*Primary Examiner* — Matthew W Jellett
(74) *Attorney, Agent, or Firm* — Fox Rothschild LLP

(57) ABSTRACT

A valve for a hydrogen tank of a fuel cell vehicle includes a first open hole for communicating with a tank-side flow passage, a blocking body for blocking the tank-side flow passage, and a second open hole that allows the tank-side flow passage to communicate with a pipe-side flow passage formed at a pilot plunger. As the pilot plunger ascends in the state in which the first open hole communicates with the tank-side flow passage, the tank-side flow passage is blocked by the blocking body and subsequently communicates with the pipe-side flow passage via the second open hole, thereby reducing the size of a section in which a pressure difference occurs between the flow passages and reducing the time taken to eliminate the pressure difference, thus securing stable supply of hydrogen from a hydrogen tank to a fuel cell.

9 Claims, 6 Drawing Sheets

(56) References Cited

U.S. PATENT DOCUMENTS

| | | | | |
|---|---|---|---|---|
| 6,994,308 | B1* | 2/2006 | Wang | F16K 1/12 |
| | | | | 251/129.21 |
| 8,066,255 | B2* | 11/2011 | Wang | F02M 21/0266 |
| | | | | 251/30.03 |
| 9,366,357 | B2* | 6/2016 | Zieger | F16K 31/0651 |
| 9,664,300 | B2* | 5/2017 | Zeiner | F16K 15/1826 |
| 10,077,709 | B2* | 9/2018 | Turner | F16K 3/0218 |
| 10,480,677 | B2* | 11/2019 | Hwang | F16K 1/126 |
| 10,907,749 | B2* | 2/2021 | Lee | F16K 31/0693 |
| 2003/0151018 | A1* | 8/2003 | Teshima | F16K 25/00 |
| | | | | 251/332 |
| 2011/0068286 | A1* | 3/2011 | Nomichi | F16K 31/0655 |
| | | | | 251/129.15 |
| 2016/0169404 | A1* | 6/2016 | Choi | F16K 31/408 |
| | | | | 251/129.15 |
| 2021/0033212 | A1* | 2/2021 | Kurz | F16K 1/443 |

* cited by examiner

VALVE FOR HYDROGEN TANK OF FUEL CELL VEHICLE

CROSS-REFERENCE TO RELATED APPLICATION

This application claims under 35 U.S.C. § 119(a) the benefit of priority to Korean Patent Application No. 10-2021-0034377 filed on Mar. 17, 2021, the entire contents of which are incorporated herein by reference.

BACKGROUND

(a) Technical Field

The present disclosure relates to a valve for a hydrogen tank of a fuel cell vehicle, and more particularly to a valve for a hydrogen tank of a fuel cell vehicle, which secures stable supply of hydrogen to a fuel cell.

(b) Background Art

A hydrogen electric truck, which is a type of fuel cell vehicle, is equipped with a fuel cell system, which includes a fuel cell stack, and a plurality of hydrogen tanks for supplying hydrogen to the fuel cell stack. A solenoid-type valve is mounted to an outlet of each of the hydrogen tanks.

Hereinafter, a conventional valve for a hydrogen tank and the operation thereof will be described. FIG. 1 is a view schematically showing a conventional valve for a hydrogen tank. As shown in FIG. 1, a valve 100 for a hydrogen tank is mounted to a valve block 200, which has a tank-side flow passage 210 connected to an outlet of a hydrogen tank and a pipe-side flow passage 220 connected to a fuel cell system, which consumes hydrogen.

The valve 100 for a hydrogen tank includes a coil unit 110, which generates magnetic force when power is applied thereto, a pilot plunger 120, which is moved upwards and downwards by the magnetic force generated by the coil unit 110, and a main plunger 130, which is disposed inside the pilot plunger 120 to be moved vertically by the magnetic force.

A hydrogen communication hole 132 is formed to penetrate the center portion of the main plunger 130 in an upward-downward (e.g., vertically) direction. In the closed state of the valve 100 for a hydrogen tank, the lower end of the main plunger 130 is in close contact with the pipe-side flow passage 220, and the pilot plunger 120 is in close contact with the upper end of the main plunger 130, whereby the hydrogen communication hole 132 is maintained in a closed state.

When power is applied to the coil unit 110 and thus the pilot plunger 120 is moved upwards by the magnetic force, as shown in FIG. 1, the hydrogen communication hole 132 in the main plunger 130 is opened, whereby hydrogen in the hydrogen tank flows from the tank-side flow passage 210 to the pipe-side flow passage 220 via the hydrogen communication hole 132. However, when the pilot plunger 120 is moved upwards by the magnetic force, the main plunger 130 does not ascend together therewith. The reason for this is that the pressure in the tank-side flow passage 210 is greater than the pressure in the pipe-side flow passage 220 by a predetermined amount or more.

In particular, when the pressure difference between the tank-side flow passage 210 and the pipe-side flow passage 220 is greater than or equal to a predetermined magnitude, the sum of the force with which a spring (not shown), disposed between the pilot plunger and the main plunger 130, presses the main plunger 130 in the downward direction and the force that is applied to the upper portion of the main plunger 130 when hydrogen flows from the tank-side flow passage 210 into the hydrogen communication hole 132 is greater than the magnetic force generated to move the main plunger 130 upwards, so the main plunger 130 does not ascend.

On the other hand, when the pressure difference between the tank-side flow passage 210 and the pipe-side flow passage 220 is less than the predetermined level, the main plunger 130 is moved upwards by the magnetic force. At this time, in the state in which the hydrogen communication hole 132 in the main plunger 130 is opened by the upward movement of the pilot plunger 120, as hydrogen in the hydrogen tank continuously flows from the tank-side flow passage 210 to the pipe-side flow passage 220 via the hydrogen communication hole 132, the pressure difference between the tank-side flow passage 210 and the pipe-side flow passage 220 gradually decreases below the predetermined level (for example, 130 bar (the pressure in the tank-side flow passage)−127 bar (the pressure in the pipe-side flow passage)=3 bar).

Accordingly, when the pressure difference between the tank-side flow passage 210 and the pipe-side flow passage 220 decreases below the predetermined level, the magnetic force generated by the application of power to the coil unit 110, i.e. the magnetic force for moving the main plunger 130 upwards, becomes greater than the sum of the force with which the spring (not shown) presses the main plunger 130 in the downward direction and the force that is applied to the upper portion of the main plunger 130 when hydrogen flows from the tank-side flow passage 210 into the hydrogen communication hole 132, whereby the main plunger 130 is moved upwards by the magnetic force.

As the main plunger 130 ascends, the pipe-side flow passage 220 is completely opened, and thus the hydrogen in the hydrogen tank directly flows from the tank-side flow passage 210 to the pipe-side flow passage 220. Accordingly, a substantial amount of hydrogen suddenly flows from the tank-side flow passage 210 to the pipe-side flow passage 220, whereby the pressure in the tank-side flow passage 210 and the pressure in the pipe-side flow passage 220 may momentarily become equal to each other.

However, the section in which the pressure difference is present between the tank-side flow passage 210 and the pipe-side flow passage 220 is too long, and thus it takes a long time to reduce the pressure difference between the tank-side flow passage 210 and the pipe-side flow passage 220 and to completely open the pipe-side flow passage 220 by moving the main plunger 130 upwards (for example, it takes about 500 seconds for main plungers of valves respectively mounted to seven or more hydrogen tanks of a hydrogen electric truck to completely ascend). Therefore, the amount of hydrogen supplied to a fuel cell stack of a fuel cell system is insufficient, resulting in a problem in that the target power output of the hydrogen electric truck is not achieved.

The above information disclosed in this section is merely for enhancement of understanding of the background of the invention, and therefore it may contain information that does not form the related art that is already known in this country to a person of ordinary skill in the art.

SUMMARY

The present invention has been made in an effort to solve the above-described problems associated with the related art, and it is an object of the present invention to provide a valve for a hydrogen tank of a fuel cell vehicle, in which a pilot plunger and a main plunger are connected to each other via a flexible connection bar and in which a first open hole for communicating with a tank-side flow passage, a blocking body for blocking the tank-side flow passage, and a second open hole for allowing the tank-side flow passage to communicate with a pipe-side flow passage are formed at the pilot plunger, whereby it is possible to rapidly eliminate a pressure difference between the flow passages, thereby inducing rapid ascent of the main plunger for communication between the flow passages, thus securing stable supply of hydrogen from a hydrogen tank to a fuel cell.

It is another object of the present invention to provide a valve for a hydrogen tank of a fuel cell vehicle, in which, as the pilot plunger ascends, the tank-side flow passage is blocked by the blocking body, whereby the pressure difference between an inlet of a hydrogen communication hole in the main plunger and the pipe-side flow passage is rapidly and automatically eliminated, and subsequently the tank-side flow passage communicates with the pipe-side flow passage via the second open hole, thereby reducing the size of a section in which a pressure difference occurs between the tank-side flow passage and the pipe-side flow passage, reducing the time taken to eliminate the pressure difference, and inducing rapid ascent of the main plunger for communication between the flow passages, thus securing stable supply of hydrogen from the hydrogen tank to the fuel cell.

In one aspect, the present invention provides a valve for a hydrogen tank of a fuel cell vehicle that may include a coil unit configured to generate magnetic force when power is applied thereto, a pilot plunger configured to be moved upwards by the magnetic force generated by the coil unit, a main plunger disposed inside the pilot plunger, the main plunger having a hydrogen communication hole formed therein, and a flexible connection bar interconnecting the pilot plunger and the main plunger. The pilot plunger is provided at one side thereof with a first open hole to communicate with a tank-side flow passage, a blocking body to block the tank-side flow passage, and a second open hole to allow the tank-side flow passage to communicate with a pipe-side flow passage.

In an exemplary embodiment, the flexible connection bar may include a plurality of upper connection bars interconnecting the inner peripheral portion of the upper portion of the pilot plunger and the outer peripheral portion of the upper portion of the main plunger and a plurality of lower connection bars interconnecting the inner peripheral portion of the lower portion of the pilot plunger and the outer peripheral portion of the lower portion of the main plunger.

The first open hole, the blocking body, and the second open hole may be sequentially arranged in the operating direction of the valve. As the pilot plunger is moved upwards by the magnetic force generated by the coil unit in the state in which the first open hole communicates with the tank-side flow passage, the tank-side flow passage may be blocked by the blocking body and subsequently may communicate with the pipe-side flow passage via the second open hole.

In addition, in the initial stage of ascent of the pilot plunger, the hydrogen communication hole in the main plunger that has been blocked by the pilot plunger may be opened, and hydrogen may flow from the tank-side flow passage to the pipe-side flow passage via the first open hole and the hydrogen communication hole.

In the intermediate stage of ascent of the pilot plunger, the blocking body may block the tank-side flow passage, whereby the flow of hydrogen through the hydrogen communication hole may be interrupted and a pressure difference between the inlet of the hydrogen communication hole in the main plunger and the pipe-side flow passage is eliminated.

Additionally, when the blocking body blocks the tank-side flow passage, the lower end of the main plunger is still maintained in close contact with the pipe-side flow passage while the flexible connection bar interconnecting the pilot plunger and the main plunger is bent, and when the pressure difference between the inlet of the hydrogen communication hole in the main plunger and the pipe-side flow passage is eliminated, the main plunger may be moved upwards, whereby the pipe-side flow passage is opened.

In the final stage of ascent of the pilot plunger, the tank-side flow passage and the pipe-side flow passage may communicate with each other via the second open hole so that hydrogen is normally supplied from the tank-side flow passage to the pipe-side flow passage opened due to the elimination of the pressure difference.

In addition, the second open hole in the pilot plunger may be formed to extend from the lower surface of the blocking body to the lower end of the pilot plunger. The main plunger may have a contact surface formed at the side thereof that faces the first open hole in the pilot plunger, the contact surface being in close contact with the pilot plunger to selectively block the first open hole, and a communication hole formed therein to extend from a portion directly under the contact surface to the lower end of the main plunger.

BRIEF DESCRIPTION OF THE DRAWINGS

The above and other features of the present invention will now be described in detail with reference to exemplary embodiments thereof, illustrated in the accompanying drawings, which are given hereinbelow by way of illustration only, and thus are not limitative of the present invention, and wherein.

Figure 1:
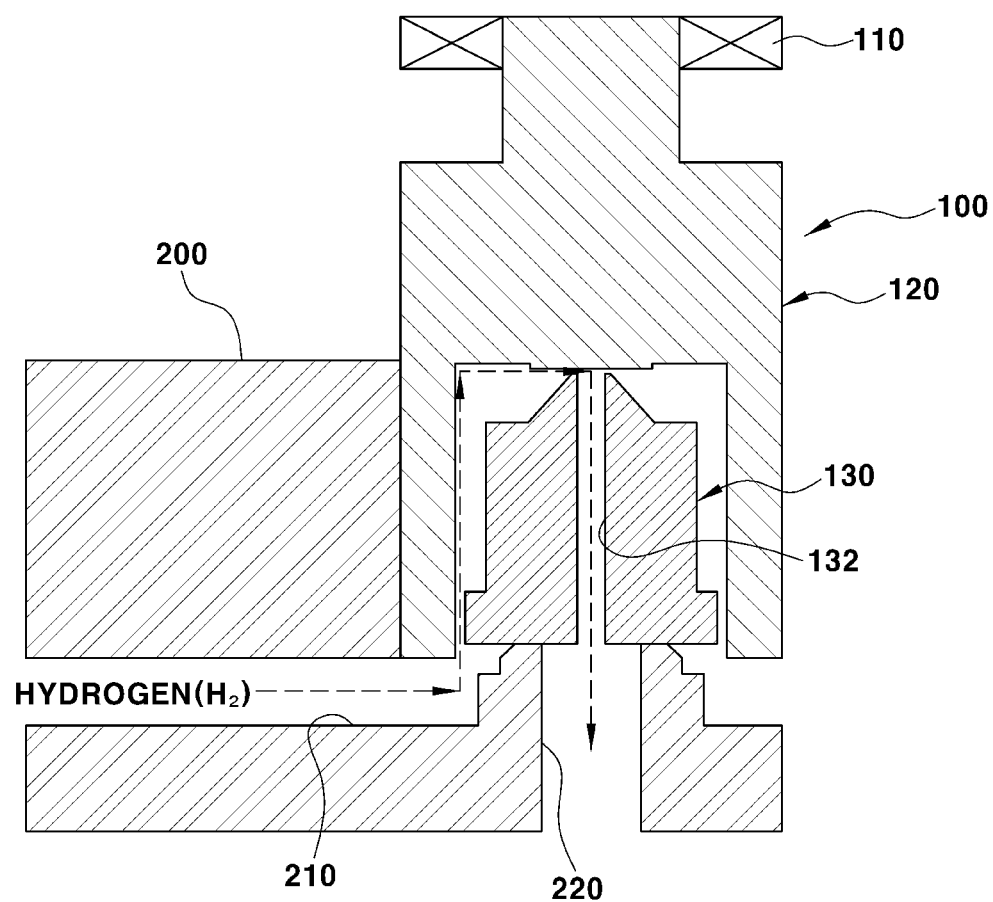
FIG. 1 is a view schematically showing a conventional valve for a hydrogen tank according to the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, reference will now be made in detail to various embodiments of the present invention, examples of which are illustrated in the accompanying drawings and described below.

Figure 2:
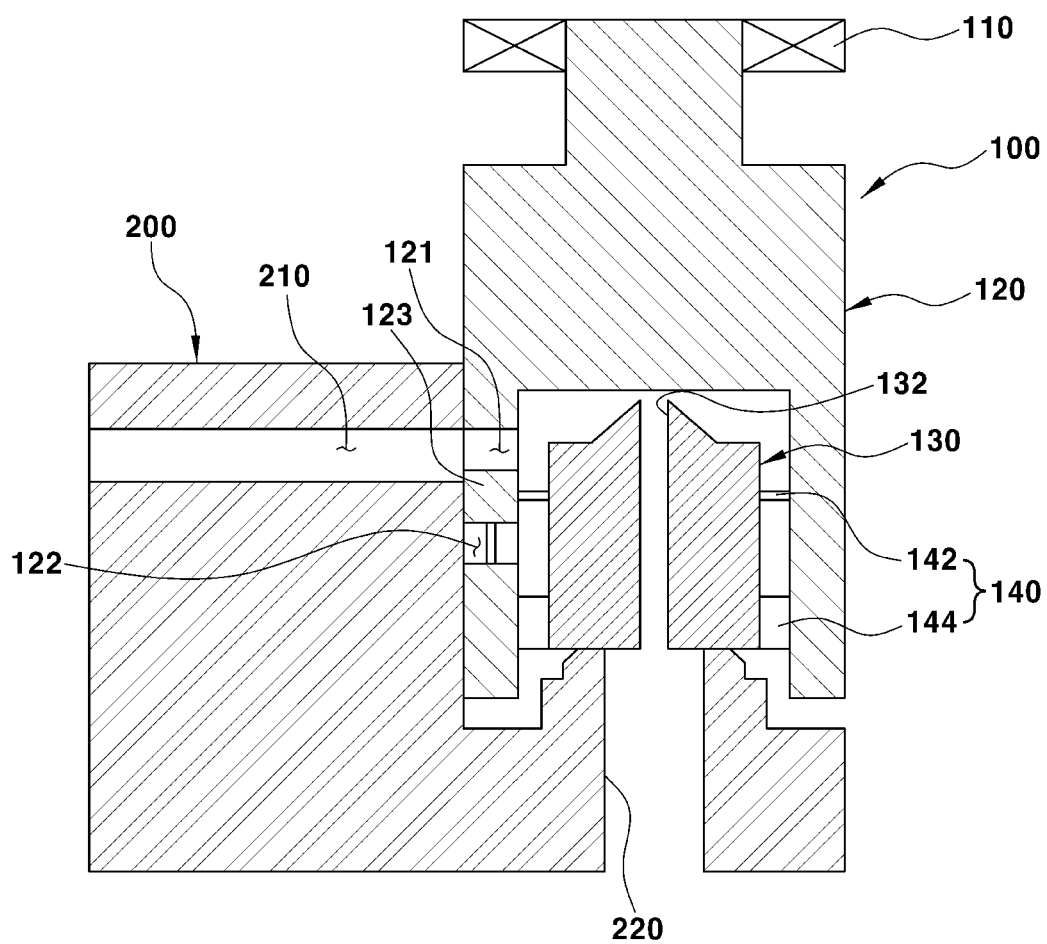
FIG. 2 is a cross-sectional view schematically showing a valve for a hydrogen tank of a fuel cell vehicle according to the present invention.

FIG. 2 is a cross-sectional view schematically showing a valve for a hydrogen tank of a fuel cell vehicle according to the present invention. As shown in FIG. 2, a valve 100 for a hydrogen tank is mounted to a valve block 200, which has a tank-side flow passage 210 connected to an outlet of a hydrogen tank and a pipe-side flow passage 220 connected to a fuel cell system, which consumes hydrogen.

The valve 100 for a hydrogen tank is a type of solenoid-type valve, and may include a coil unit 110, which generates magnetic force when power is applied thereto, a pilot plunger 120, which is moved vertically (e.g., upwards and downwards) by the magnetic force generated by the coil unit 110, and a main plunger 130, which is disposed inside the pilot plunger 120 to be moved upwards and downwards by the magnetic force. A hydrogen communication hole 132 is formed to penetrate the center portion of the main plunger 130 in an upward-downward direction.

According to the present invention, the pilot plunger 120 and the main plunger 130 are integrally connected to each other by a flexible connection bar 140. In particular, the flexible connection bar 140 may include a plurality of upper connection bars 142, which interconnect the inner peripheral portion of the upper portion of the pilot plunger 120 and the outer peripheral portion of the upper portion of the main plunger 130, and a plurality of lower connection bars 144, which interconnect the inner peripheral portion of the lower portion of the pilot plunger 120 and the outer peripheral portion of the lower portion of the main plunger 130.

Accordingly, due to the plurality of upper connection bars 142 and the plurality of lower connection bars 144, the pilot plunger 120 and the main plunger 130 are stably connected to each other, and lateral movement of the main plunger 130 is minimized. In particular, when viewed from above, the plurality of upper connection bars 142 and the plurality of lower connection bars 144, which constitute the flexible connection bar 140, are arranged to extend radially from the outer peripheral surface of the main plunger 130.

A first open hole 121, which communicates with the tank-side flow passage 210, a blocking body 123, which blocks the tank-side flow passage 210, and a second open hole 122, which allows the tank-side flow passage 210 and the pipe-side flow passage 220 to communicate with each other, are formed at one side of the pilot plunger 120. The first open hole 121, the blocking body 123, and the second open hole 122 are sequentially arranged in the operating direction of the valve.

As one example, the first open hole 121, the blocking body 123, and the second open hole 122 are sequentially arranged from the upper portion to the lower portion of the pilot plunger 120. The valve 100 for a hydrogen tank according to the present invention configured as described above is maintained in a closed state when a fuel cell vehicle (e.g. a hydrogen electric truck) is not operating.

In other words, the lower end of the main plunger 130 is in close contact with the pipe-side flow passage 220, whereby the pipe-side flow passage 220 is maintained in a closed state, and at the same time, the pilot plunger 120 is in close contact with the upper end of the main plunger 130, whereby the hydrogen communication hole 132 is maintained in a closed state. In this state, when the fuel cell vehicle (e.g. the hydrogen electric truck) is turned on, power may be applied to the coil unit 110, and the pilot plunger 120 starts to ascend due to the magnetic force generated by the coil unit 110.

Particularly, when the first open hole 121 communicates with the tank-side flow passage 210, the pilot plunger 120 starts to ascend due to the magnetic force generated by the coil unit 110. Thereafter, the pilot plunger 120 ascends to a position at which the blocking body 123 blocks the tank-side flow passage 210, and subsequently further ascends to a position at which the second open hole 122 allows the tank-side flow passage 210 and the pipe-side flow passage 220 to communicate with each other.

Figure 3:
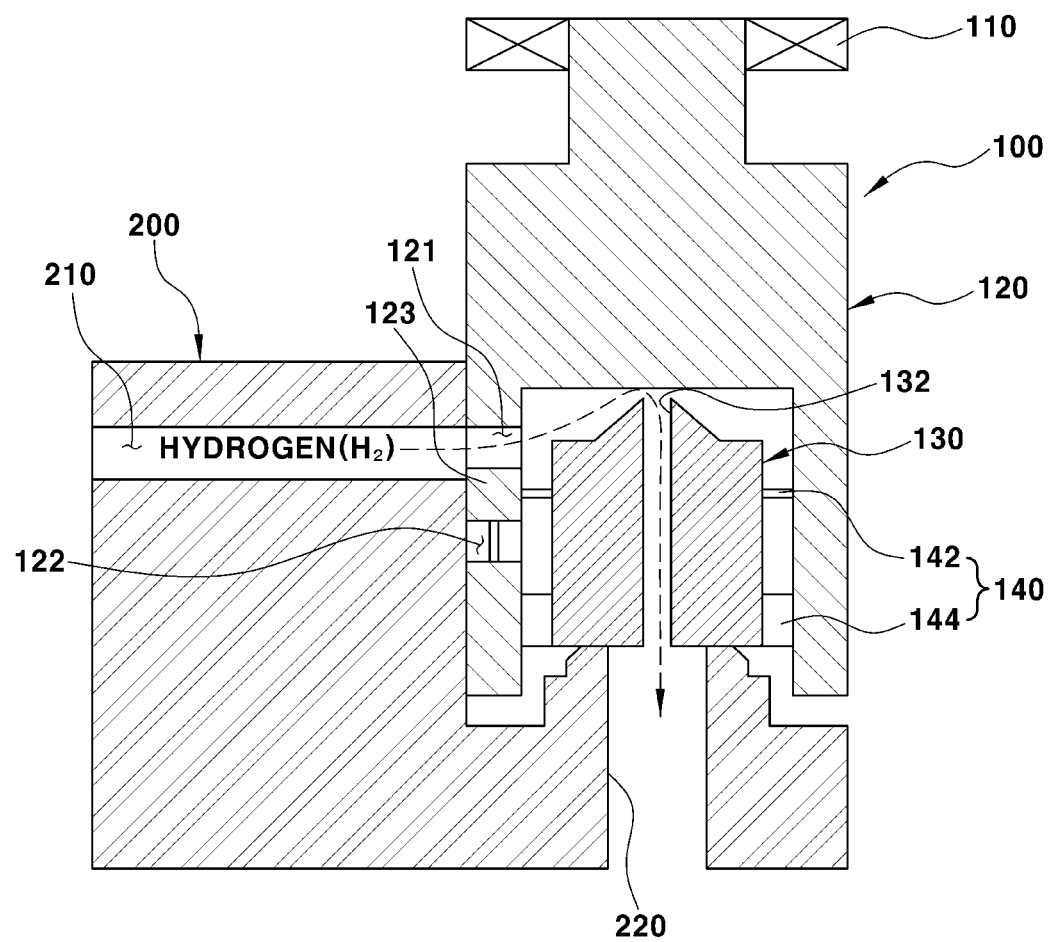
FIGS. 3, 4 and 5 are schematic cross-sectional views sequentially showing the process of operation of the valve for a hydrogen tank of a fuel cell vehicle according to the present invention.
Figure 4:
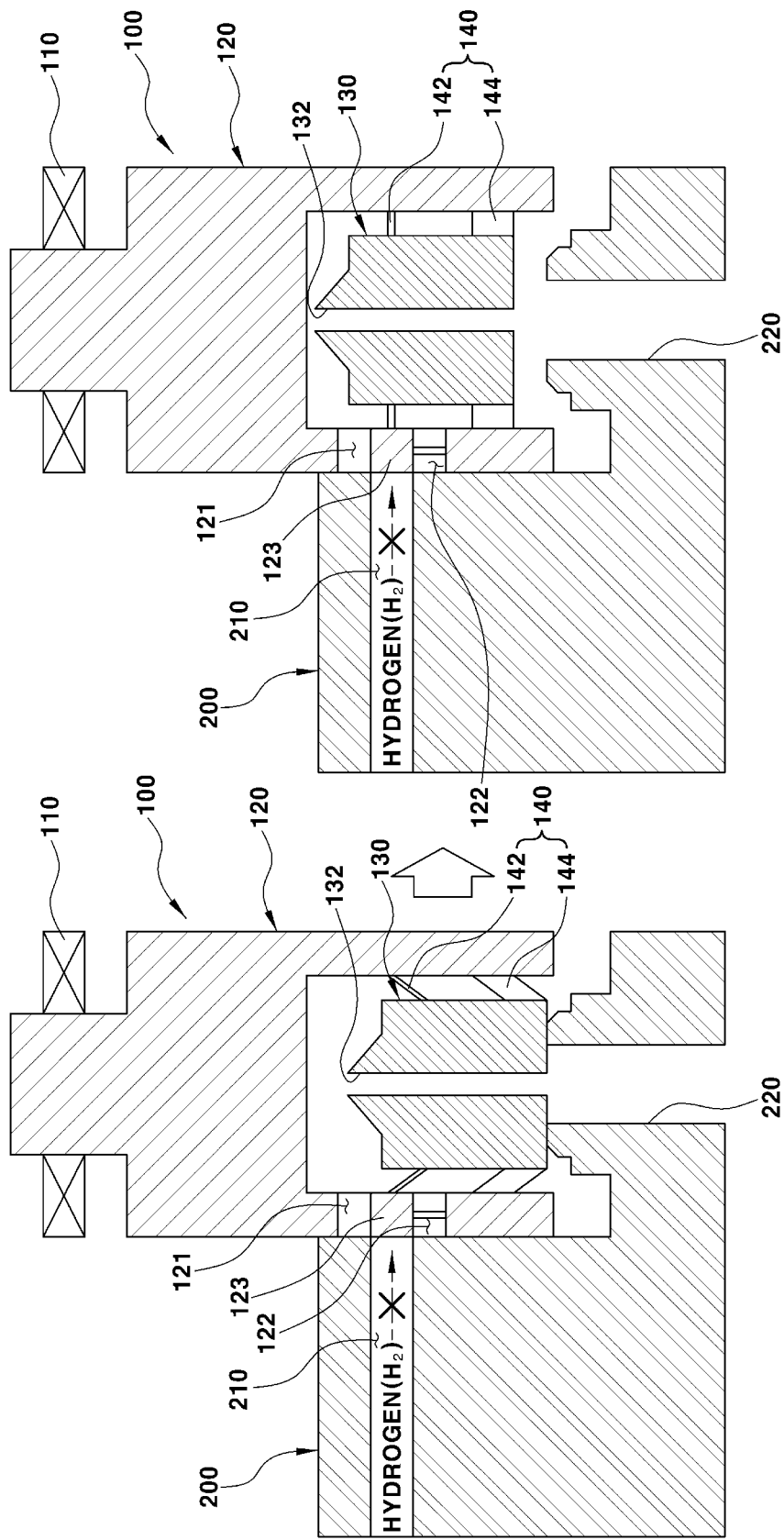
Figure 5:
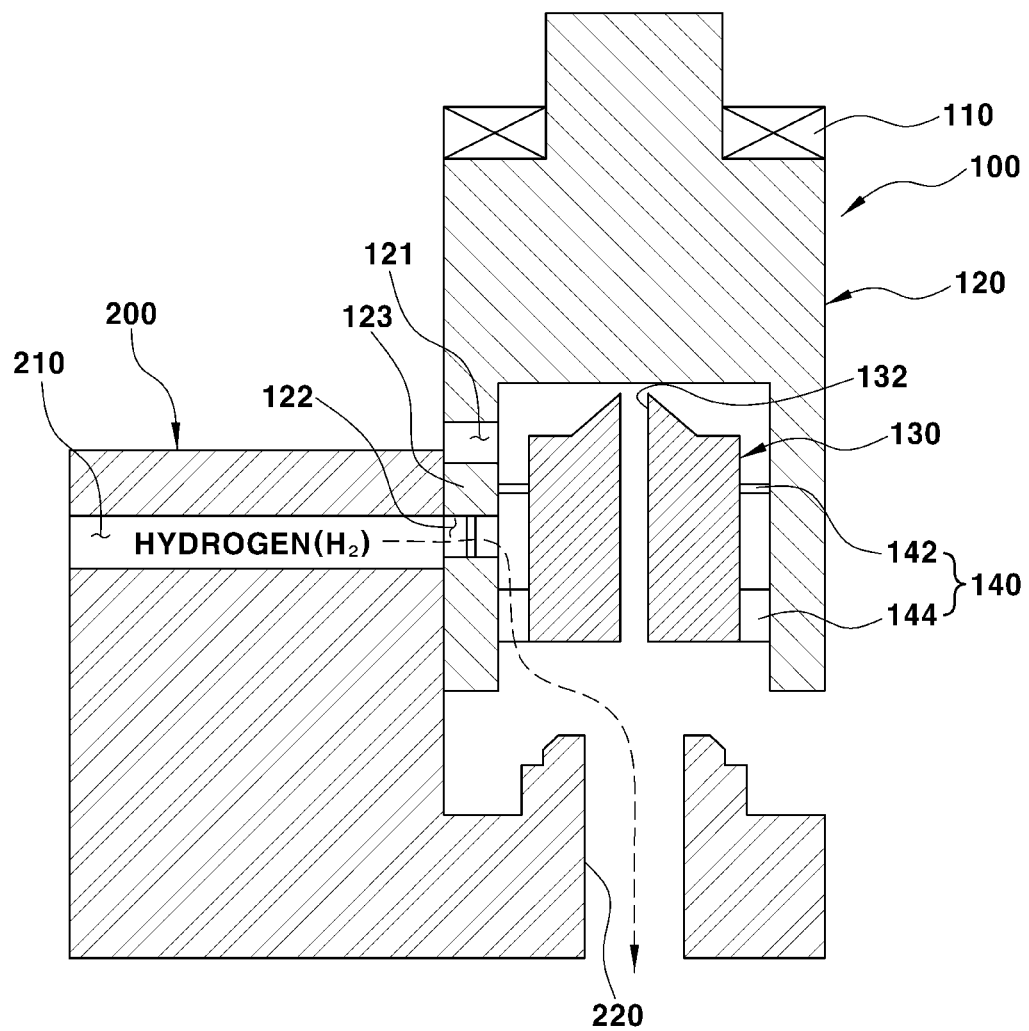

Hereinafter, the operation of the valve for a hydrogen tank according to the present invention, configured as described above, will be described. FIGS. 3, 4 and 5 are schematic cross-sectional views sequentially showing the process of operation of the valve for a hydrogen tank of a fuel cell vehicle according to the present invention. FIG. 3 shows the initial stage of ascent of the pilot plunger, FIG. 4 shows the intermediate stage of ascent of the pilot plunger, and FIG. 5 shows the final stage of ascent of the pilot plunger.

First, in the initial stage, in which the pilot plunger 120 starts to ascend due to the magnetic force generated by the coil unit 110, as shown in FIG. 3, the upper portion of the hydrogen communication hole 132 in the main plunger 130, which is blocked by the pilot plunger 120, is opened. Accordingly, a minimal amount of hydrogen flows from the tank-side flow passage 210 to the pipe-side flow passage 220 via the first open hole 121 in the pilot plunger 120 and the hydrogen communication hole 132 in the main plunger 130. At this time, the main plunger 130 is still maintained in the state of being in close contact with the upper portion of the pipe-side flow passage 220 without moving.

In particular, the main plunger 130 does not move due to a substantial pressure difference between the tank-side flow passage 210 and the pipe-side flow passage 220; specifically, the pressure in the tank-side flow passage 210 is greater than the pressure in the pipe-side flow passage 220 by a predetermined level or more, and thus hydrogen pressure is applied to the upper portion of the main plunger 130.

Subsequently, in the intermediate stage of ascent of the pilot plunger 120, the blocking body 123 blocks the tank-side flow passage 210, whereby the flow of hydrogen through the hydrogen communication hole 132 is interrupted, and at the same time, the pressure difference between the inlet of the hydrogen communication hole 132 in the main plunger 130 and the pipe-side flow passage 220 is eliminated.

In other words, when the pilot plunger 120 ascends to a position at which the blocking body 123 blocks the tank-side flow passage 210, the pressure in the tank-side flow passage 210 is cut off. Accordingly, the flow of hydrogen through the hydrogen communication hole 132 is interrupted, and at the same time, the pressure difference between the inlet of the hydrogen communication hole 132 in the main plunger 130 and the pipe-side flow passage 220 is momentarily eliminated.

More specifically, when the blocking body 123 initially blocks the tank-side flow passage 210, there is a pressure difference of a certain magnitude between the inlet of the hydrogen communication hole 132 in the main plunger 130 and the pipe-side flow passage 220. Thus, as shown in the drawing on the left in FIG. 4, the lower end of the main plunger 130 is still maintained in close contact with the pipe-side flow passage 220. At this time, the flexible connection bar 140, which interconnects the pilot plunger 120 and the main plunger 130 while interposed therebetween, is temporarily bent. Thereafter, as shown in the drawing on the right in FIG. 4, when the pressure difference between the inlet of the hydrogen communication hole 132 in the main plunger 130 and the pipe-side flow passage 220 is eliminated and thus the pressures thereof become equal to each other, the main plunger 130 is moved upwards by the elastic restoring force of the flexible connection bar 140, whereby the pipe-side flow passage 220 is opened.

Subsequently, in the final stage of ascent of the pilot plunger 120, to normally supply hydrogen from the tank-side flow passage 210 to the pipe-side flow passage 220, which is open due to the elimination of the pressure difference, the tank-side flow passage 210 and the pipe-side flow passage 220 communicate with each other via the second open hole 122 in the pilot plunger 120

In other words, when the pilot plunger 120 ascends to the maximum extent, the second open hole 122 is located at a position at which the tank-side flow passage 210 and the pipe-side flow passage 220 communicate with each other. At this time, as shown in FIG. 5, since the tank-side flow passage 210 and the pipe-side flow passage 220 communicate with each other via the second open hole 122, the hydrogen in the tank-side flow passage 210 is capable of being supplied more smoothly to the pipe-side flow passage 220 via the second open hole 122.

As described above, according to the embodiment of the present invention, it is possible to more rapidly eliminate the pressure difference between the inlet of the hydrogen communication hole 132 in the main plunger 130 and the pipe-side flow passage 220 by blocking the tank-side flow passage 210 using the blocking body 123 of the pilot plunger 120, whereby the main plunger 130 ascends smoothly and the pipe-side flow passage 220 is opened rapidly.

As a result, hydrogen is supplied more stably from the hydrogen tank, which is connected to the tank-side flow passage 210, to the fuel cell stack of the fuel cell system, which is connected to the pipe-side flow passage 220, thereby making it possible to solve the problem with the conventional art in which the amount of hydrogen supplied to a fuel cell stack is insufficient, and thus a target power output of a hydrogen electric truck is not achieved.

Figure 6:
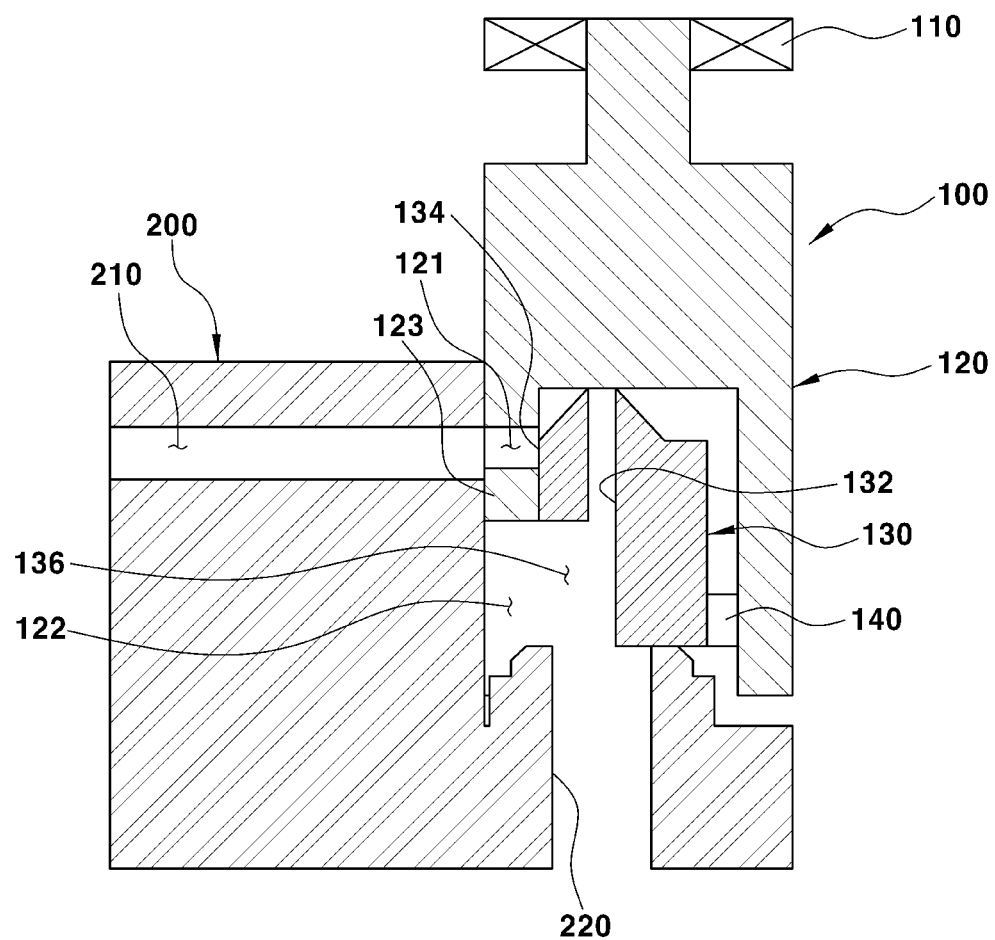
FIG. 6 is a cross-sectional view schematically showing a valve for a hydrogen tank of a fuel cell vehicle according to another embodiment of the present invention.

Hereinafter, the structure of a valve for a hydrogen tank according to another embodiment of the present invention will be described. FIG. 6 is a cross-sectional view schematically showing a valve for a hydrogen tank of a fuel cell vehicle according to another embodiment of the present invention.

As shown in FIG. 6, a valve 100 for a hydrogen tank according to another embodiment of the present invention includes a coil unit 110, which generates magnetic force when power is applied thereto, a pilot plunger 120, which is moved vertically (e.g., upwards and downwards) by the magnetic force generated by the coil unit 110, and a main plunger 130, which is disposed inside the pilot plunger 120 to be moved upwards and downwards by the magnetic force. A hydrogen communication hole 132 is formed to penetrate the center portion of the main plunger 130 in the vertical direction.

In addition, the inner peripheral portion of the lower portion of the pilot plunger 120 and the outer peripheral portion of the lower portion of the main plunger 130 are connected to each other via a flexible connection bar 140. The present embodiment is characterized in that the length of a flow passage in which a pressure difference occurs is further reduced.

Accordingly, a first open hole 121, which communicates with the tank-side flow passage 210, a blocking body 123, which blocks the tank-side flow passage 210, and a second open hole 122, through which the tank-side flow passage 210 and the pipe-side flow passage 220 communicate with each other, may be formed at one side of the pilot plunger 120. The first open hole 121, the blocking body 123, and the second open hole 122 may be arranged sequentially from the upper portion to the lower portion of the pilot plunger 120. The second open hole 122 may be formed to be relatively large in a shape extending from the lower surface of the blocking body 123 to the lower end of the pilot plunger 120.

In addition, the main plunger 130 has a contact surface 134 formed at the side thereof that faces the first open hole 121 in the pilot plunger 120. The contact surface 134 is in close contact with the pilot plunger 120 to selectively block the first open hole 121. The main plunger 130 has a communication hole 136 formed therein to extend from a portion directly under the contact surface 134 to the lower end of the main plunger 130.

Accordingly, the vertical length of the hydrogen communication hole 132 in the main plunger 130 is reduced due to the communication hole 136 in the main plunger 130, whereby the length of the flow passage, in which a pressure difference occurs between the inlet of the hydrogen communication hole 132 in the main plunger 130 and the pipe-side flow passage 220, is reduced. As a result, according to the present embodiment, as the pilot plunger 120 is moved upwards by the magnetic force generated by the coil unit 110, the tank-side flow passage 210 may be blocked by the blocking body 123 of the pilot plunger 120, thereby making it possible to more rapidly eliminate the pressure difference between the inlet of the hydrogen communication hole 132 in the main plunger 130 and the pipe-side flow passage 220.

Subsequently, when the pilot plunger 120 ascends to the maximum extent, the tank-side flow passage 210 and the pipe-side flow passage 220 communicate with each other via the second open hole 122 in the pilot plunger 120 and the communication hole 136 in the main plunger 130, whereby hydrogen is supplied more stably from the hydrogen tank to the fuel cell stack of the fuel cell system.

As is apparent from the above description, the present invention has the following effects.

First, the pilot plunger and the main plunger, which constitute the valve for a hydrogen tank, are connected to each other via the flexible connection bar, and the first open hole for communicating with the tank-side flow passage, the blocking body for blocking the tank-side flow passage, and the second open hole for allowing the tank-side flow passage and the pipe-side flow passage to communicate with each other are formed at the pilot plunger, whereby, as the pilot plunger is moved upwards by magnetic force, the tank-side flow passage is blocked by the blocking body, whereby a pressure difference between the inlet of the hydrogen communication hole in the main plunger and the pipe-side flow passage is rapidly and automatically eliminated.

Second, it may be possible to rapidly eliminate the pressure difference between the inlet of the hydrogen communication hole in the main plunger and the pipe-side flow passage by blocking the tank-side flow passage using the blocking body of the pilot plunger, thereby reducing the size of the section in which the pressure difference occurs between the tank-side flow passage and the pipe-side flow passage, and at the same time, shortening the time taken to eliminate the pressure difference.

Third, when the tank-side flow passage is blocked by the blocking body of the pilot plunger, the pressure difference between the inlet of the hydrogen communication hole in the main plunger and the pipe-side flow passage is eliminated, and thus the pressures thereof become equal to each other, whereby the main plunger ascends more smoothly, and accordingly the pipe-side flow passage is opened more rapidly and communicates with the tank-side flow passage via the second open hole, thereby making it possible to more stably hydrogen from a hydrogen tank to a fuel cell stack of a fuel cell system.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A valve for a hydrogen tank of a fuel cell vehicle, the valve comprising:
    a coil unit configured to generate a magnetic force when power is applied thereto;
    a pilot plunger configured to be moved upwards by the magnetic force generated by the coil unit;
    a main plunger disposed inside the pilot plunger, wherein the main plunger includes a hydrogen communication hole formed therein; and
    a flexible connection bar interconnecting the pilot plunger and the main plunger,
    wherein the pilot plunger is provided at one side thereof with a first open hole to communicate with a tank-side flow passage, a blocking body to block the tank-side flow passage, and a second open hole to allow the tank-side flow passage to communicate with a pipe-side flow passage.

2. The valve of claim 1, wherein the flexible connection bar includes:
    a plurality of upper connection bars interconnecting an inner peripheral portion of an upper portion of the pilot plunger and an outer peripheral portion of an upper portion of the main plunger; and
    a plurality of lower connection bars interconnecting an inner peripheral portion of a lower portion of the pilot plunger and an outer peripheral portion of a lower portion of the main plunger.

3. The valve of claim 1, wherein the first open hole, the blocking body, and the second open hole are sequentially arranged in an operating direction of the valve, and wherein, as the pilot plunger is moved upwards by the magnetic force generated by the coil unit in a state in which the first open hole communicates with the tank-side flow passage, the tank-side flow passage is blocked by the blocking body and subsequently communicates with the pipe-side flow passage via the second open hole.

4. The valve of claim 3, wherein, in an initial stage of ascent of the pilot plunger, the hydrogen communication hole in the main plunger that has been blocked by the pilot plunger is opened, and hydrogen flows from the tank-side flow passage to the pipe-side flow passage via the first open hole and the hydrogen communication hole.

5. The valve of claim 4, wherein, in an intermediate stage of ascent of the pilot plunger, the blocking body blocks the tank-side flow passage, whereby flow of hydrogen through the hydrogen communication hole is interrupted and a pressure difference between an inlet of the hydrogen communication hole in the main plunger and the pipe-side flow passage is eliminated.

6. The valve of claim 5, wherein, when the blocking body blocks the tank-side flow passage, a lower end of the main plunger is maintained in close contact with the pipe-side flow passage while the flexible connection bar interconnecting the pilot plunger and the main plunger is bent, and wherein, when the pressure difference between the inlet of the hydrogen communication hole in the main plunger and the pipe-side flow passage is eliminated, the main plunger is moved upwards and the pipe-side flow passage is opened.

7. The valve of claim 6, wherein, in a final stage of ascent of the pilot plunger, the tank-side flow passage and the pipe-side flow passage communicate with each other via the second open hole to supply hydrogen from the tank-side flow passage to the pipe-side flow passage opened due to elimination of the pressure difference.

8. The valve of claim 1, wherein the second open hole in the pilot plunger is formed to extend from a lower surface of the blocking body to a lower end of the pilot plunger.

9. The valve of claim 8, wherein the main plunger has a contact surface formed at a side thereof that faces the first open hole in the pilot plunger, the contact surface being in close contact with the pilot plunger to selectively block the first open hole, and a communication hole formed therein to extend from a portion directly under the contact surface to a lower end of the main plunger.

* * * * *